Patented Mar. 27, 1928.

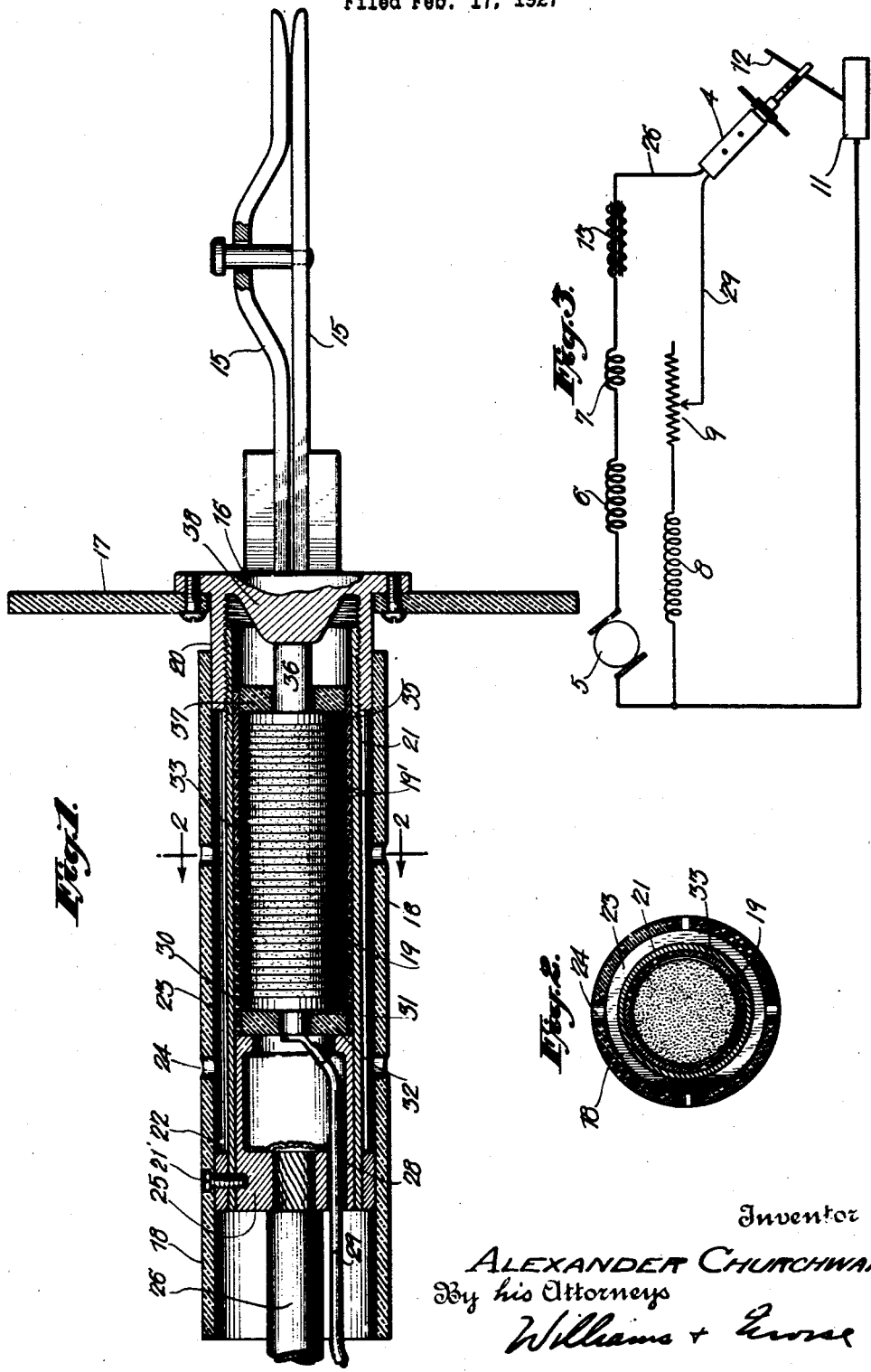

1,664,022

UNITED STATES PATENT OFFICE.

ALEXANDER CHURCHWARD, OF NEW YORK, N. Y., ASSIGNOR TO WILSON WELDER & METALS COMPANY, INC., OF HOBOKEN, NEW JERSEY, A CORPORATION OF NEW YORK.

ELECTRIC WELDING APPARATUS.

Application filed February 17, 1927. Serial No. 168,939.

This invention relates to electric welding apparatus, and has particular reference to an auxiliary regulating means for such apparatus.

According to usual practice, the welding current furnished by the direct current generator of an electric welding apparatus is entirely controlled by means, usually a field rheostat, located on the control panel of the machine. Before commencing a welding operation, the operator adjusts such control means so that the generator will furnish the current which the operator regards as desirable for the particular kind of work in hand. It often happens, however, that the welding current changes during the welding operation due, for example, to changes in the voltage of the current supplied by a power circuit to the motor which drives the welding generator, and the operator finds it necessary to adjust the field rheostat or the control panel in order to keep the welding current at the desired value. Even when the welding work is located near the control panel of the welding machine, such adjustments take the operator from his work and result in loss of his time; but when the work is located at a distance from the control panel, as is often the case, it is particularly inconvenient for the operator to go to the control panel and readjust the welding current, and he loses considerable time from his welding work if he does so.

The general object of the present invention is to provide a simple and efficient auxiliary regulating means, which is always within easy reach of the welding operator regardless of where the work may be located; and the invention is characterized by the fact that such auxiliary regulating means is incorporated in and constitutes a part of an electrode holder which is held by the operator during the welding work and is therefore always conveniently located with reference to him.

Other objects and advantages of the invention will become apparent from the following description, taken in connection with the accompanying drawings in which, Figure 1 is a longitudinal, central, sectional view of a combined control means and electrode holder. Figure 2 is a transverse, sectional view taken on the line 2—2 of Figure 1. Figure 3 is a diagrammatic view of a welding circuit with which the combined control means and electrode holder is adapted to be used.

Referring to Figure 3, the combined control means and electrode holder 4 is illustrated in connection with a welding apparatus in which 5 indicates the armature, 6 the interpole series field, and 7 the main series field of an undercompounded direct current generator having a shunt field 8 capable of being regulated by an adjustable rheostat 9 located on the control panel of the machine. One of the generator brushes is shown connected with a part 11 to be welded, and the other generator brush is shown connected to a welding electrode 12 through the series field windings 6 and 7, a reactance 13 located in the welding circuit, and certain elements of the combined control means and electrode holder hereinafter more particularly described.

Referring to Figure 1, the combined control means and electrode holder 4 includes a pair of fingers 15, between which the electrode 12 is gripped, the fingers 15 being connected to a rotatable head 16, to which is suitably connected a disc 17 preferably of insulating material, by means of which the head 16 may be rotated with respect to the handle portion 18 of the holder, which is made of a suitable insulating material and serves as a housing for an adjustable rheostat 19 made up of a plurality of carbon discs 19'. The head 16 includes an internally screw-threaded flange 20, which is adapted for screw-threaded connection with the exteriorly screw-threaded end of a barrel 21, secured to the housing 18 by screws 21' or the like, passing through an annular spacing ring 22, which serves to maintain the barrel 21 in a spaced relation to the housing 18, thus providing an air space 23 which is vented by a plurality of openings or ports 24 formed in the housing 18.

Into one end of the barrel 21 is fitted a metallic abutment or terminal 25, which may be secured to the metallic barrel 21 by the same screws 21' that are employed to secure the barrel 21 to the housing 18. This abutment or terminal 25 is adapted for connection with the bared end of a welding cable 26, which constitutes that portion of the welding circuit shown in Figure 3, as leading from the reactance 13 to the combined control means and electrode holder 4 and is provided with an opening 28, adapted for the reception of an insulated conductor 29 leading from the rheostat 9 to a metallic compression disc 30, having a stem 31 which is received by an insulating washer 32, adapted to prevent direct electrical connection of the open end of the abutment 25 with the compression disc 30. The carbon discs 19' are insulated from the barrel 21 by reason of the fact that they are carried within an insulating tube 33, which is adapted to snugly fit the metallic tube 21 and engage one end of the abutment 25. The opposite end of the insulating tube 33 carries a metallic compression disc 35, having a stem 36, which projects through a suitable washer or guide 37 of insulating material carried within the insulating tube 33, the projecting end of the stem 36 being adapted to engage a tapered projection 38 carried by the rotatable head 16.

The welding circuit may be traced, from one brush of the generator, through the series fields 6 and 7 and the reactance 13 to the point of connection of the cable 26 with the abutment 25, and then through the abutment 25, metallic barrel 21, and the head 16 to the welding electrode 12, the welding circuit being completed through the work 11 to the other brush of the generator. The shunt field circuit may be traced from one brush of the generator, through the shunt field 8, panel board rheostat 9, wire 29, stem 31, disc 30, the several carbon discs 19', disc 35, stem 36, projection 38, head 16, barrel 21, abutment 25 to the cable 26 connected to the other brush of the generator through the reactance 13 and the series fields 7 and 6.

From the above description it will be appreciated that by varying the pressure upon the carbon discs 19', by rotating the housing 18 one way or the other with respect to the head 16, the resistance in the shunt field winding 8 may be easily varied by the operator, without leaving his work, to effect the desired control of the welding current, as circumstances may require.

What is claimed is:

1. For use in electric welding, a combined electrode holder and shunt field resistance comprising a handle portion, a resistance element housed therein, means manually operable from the exterior of said handle portion for varying the resistance of said resistance element, and means for holding an electrode.

2. For use in electric welding, a combined electrode holder and shunt field resistance comprising a handle portion, means movably supported on said handle portion for holding an electrode, and a resistance element housed within said handle portion and varied in resistance by relative movement of said handle portion and said electrode holding means.

3. For use in electric welding, a combined electrode holder and shunt field resistance comprising a handle portion, an electrode holding means rotatably mounted on said handle portion, a resistance element housed within said handle portion, and means cooperating with said resistance element and said electrode holding means for varying the resistance of said resistance element by the relative rotation of said handle portion and said electrode holding means.

4. For use in electric welding, a combined electrode holder and shunt field resistance comprising a handle portion, having a housing, a carbon pile resistance element arranged within said housing, an electrode holder with which said handle portion is rotatably connected, and means within said housing cooperating with said carbon pile resistance and said electrode holder for varying the resistance of the carbon pile by relative rotation of said handle portion and said electrode holding means.

5. For use in electric welding, a combined electrode holder and shunt field resistance comprising a handle portion, a metal barrel therein adapted to be electrically connected to an electric cable, an electrode holder rotatably connected to said barrel, a carbon pile resistance element arranged within said barrel and insulated therefrom and adapted to be connected at one end to an electric conductor, and means for connecting the other end of said carbon pile to said electrode holder and for varying the pressure of said carbon pile as the handle portion and electrode holder are rotated with reference to one another.

In testimony whereof, I have affixed my signature to this specification.

ALEXANDER CHURCHWARD.